United States Patent [19]
Roeske

[11] 3,856,040
[45] Dec. 24, 1974

[54] ANALOG POSITION CONTROLLER HAVING TWO STAGE VALVE CONTROL
[76] Inventor: Eugene A. Roeske, 9S125 Lake Dr., Clarendon Hills, Ill. 60514
[22] Filed: Apr. 6, 1973
[21] Appl. No.: 348,642

[52] U.S. Cl............................. 137/488, 137/625.6
[51] Int. Cl....................... F16k 31/12, G05d 16/06
[58] Field of Search............ 137/488, 625.6, 625.66, 137/492, 492.5, 625.48, 625.63; 251/335.1, 335

[56] References Cited
UNITED STATES PATENTS
| | | | |
|---|---|---|---|
| 3,119,409 | 1/1964 | Allan | 137/488 |
| 3,625,246 | 12/1971 | Reaves | 137/488 |
| 3,722,534 | 3/1973 | Brevnich | 137/488 |
| 3,730,214 | 5/1973 | Brumm | 137/488 |

Primary Examiner—William R. Cline
Assistant Examiner—Robert J. Miller
Attorney, Agent, or Firm—Roy E. Petherbridge; Robert L. Lindgren; Edward D. Gilhooly

[57] ABSTRACT

An analog position controller having two stage valve control for varying the operative position of a control device such as a valve in response to a pressure signal proportional to a variable parameter being controlled by the control device. The analog position controller includes a control valve assembly slidably mounted to respond to the variable parameter wherein movement of the valve transmits a pressure signal to a pressure-sensitive power means to change the position of the control device. The controller includes the double diaphragm valve arrangement which is utilized to control operation of the controller.

6 Claims, 5 Drawing Figures

ANALOG POSITION CONTROLLER HAVING TWO STAGE VALVE CONTROL

BACKGROUND OF THE INVENTION

This invention relates in general to control devices and, in particular, to an analog position controller having a two stage valve control.

More specifically, the invention relates to an apparatus for controlling the operative position of the control device according to demand or change of a variable condition being controlled. The analog controller herein disclosed responds to the variable condition whereby a pressure signal proportional thereto is transmitted to a valve assembly of the controller which transmits the pressure signal to a pressure-sensitive power means to change the position of the control device. Movement of the valve assembly is controlled by a two stage means which increases the range of use and capability of a controller.

In my prior U.S. Pat. No. 3,636,973 issued Jan. 25, 1972 for "Analog Position Controller" there was disclosed an improved apparatus for effectively controlling a power device according to a pressure input signal representative of the variable condition. The pressure signal input to the controller may be dependent on a variety of variable parameters of a media such as, for example, temperature, pressures, specific gravity and the like. The particular parameter is converted into a pressure signal in a conventional manner which signal is directed to the novel controller as disclosed in the patent. The pressure signal thereafter displaces a valve element of the controller in a manner to conduct a pressure signal to a power device to achieve a desired change of the operative position of the control device during the condition in the media. The pressure signal from the analog position controller continues to be directed to the power device until the control device varies the condition of the media to a level whereby the parameter returns to the desired level. The continuous change of the power device while the controller is sensing an increase or decrease of an input signal is fed back in such a manner that the valve of the invention eventually returns to a null position at which time the control signal transmitted to the power device is balanced to stop movement of the control device.

Although the analog position controller disclosed in U.S. Pat. No. 3,636,973 significantly improves the prior art, it has been found that the controller disclosed therein is limited in range, accuracy and adjustment because of the design of the diaphragm utilized to control the valve assembly operating the controller. A large number of diaphragm spring combinations in the device of the patent are required to cover the necessary pressure ranges normally encountered whereby fine adjustment being possible by adjusting the position of the cam follower of the analog position controller of the patent. One reason for the foregoing problem resulted because the diaphragm thereof had to undergo a relatively large stroke in order to operate the valve assembly. By undergoing such a large stroke the material and thickness of the diaphragm had to necessarily be limited and high pressures sometimes could not be encountered. Therefore, it is desirable to improve the analog position controller disclosed in U.S. Pat. No. 3,636,973 by providing better control of the valve assembly operating the apparatus.

SUMMARY OF THE INVENTION

It is, therefore, an object of this invention to improve the control of a variable control device according to a variable condition.

Another object of this invention is to improve an analog position controller.

A further object of this invention is to convert a pressure signal into a control signal in an analog relationship.

Still another object of this invention is to control an analog position controller by means of a two stage diaphragm and valve control unit.

These and other objects are attained in accordance with the present invention wherein there is provided an analog position controller having a two stage diaphragm and valve control for effectively controlling a power device of an analog position controller according to a pressure signal input representative of a variable condition. The pressure signal input to the controller is dependent on a variety of variable parameters of a media such as, for example, temperature, pressure, specific gravity and the like. The function and operation of the controller of the application is similar to the controller described in U.S. Pat. No. 3,636,973 with the exception that the diaphragm actuator assembly coupled to the actuator stem which in turn operates the valve assembly of the controller is modified to operate on a two stage basis. Such an improvement of the controller of the patent results in the achievement of greater accuracy of the controller since the diaphragm thereof causing movement of the actuator stem does not have to be subjected to the range of pressures which the controller must operate. Such improved results are achieved because a second diaphragm is utilized to operate in conjunction with a valve arrangement to control the movement of the actuator stem diaphragm coupled to the valve assembly.

The controller of the invention also achieves improved performance over the device described in U.S. Pat. No. 3,636,973 and provides much greater flexibility in adjustment of the response of the apparatus. The controller of the above patent provided adjustability by varying the diaphragm and spring combination to cover the necessary pressure ranges with fine adjustments being made by adjusting the position of the cam follower. In the controller herein disclosed, adjustments are made much more readily with greater accuracy because of the use of two diaphragms and an adjustable spring utilized to effect the response characteristics of the controller. Accordingly, the controller of the invention achieves improved accuracy with a device which is relatively inexpensive to manufacture and which provides trouble free performance in operation.

BRIEF DESCRIPTION OF THE DRAWINGS

Further objects of the invention, together with additional features contributing thereto and advantages accruing therefrom, will be apparent from the following description of an embodiment of the invention when read in conjunction with the accompanying drawings, wherein.

DESCRIPTION OF THE PREFERRED EMBODIMENT

Figure 1:
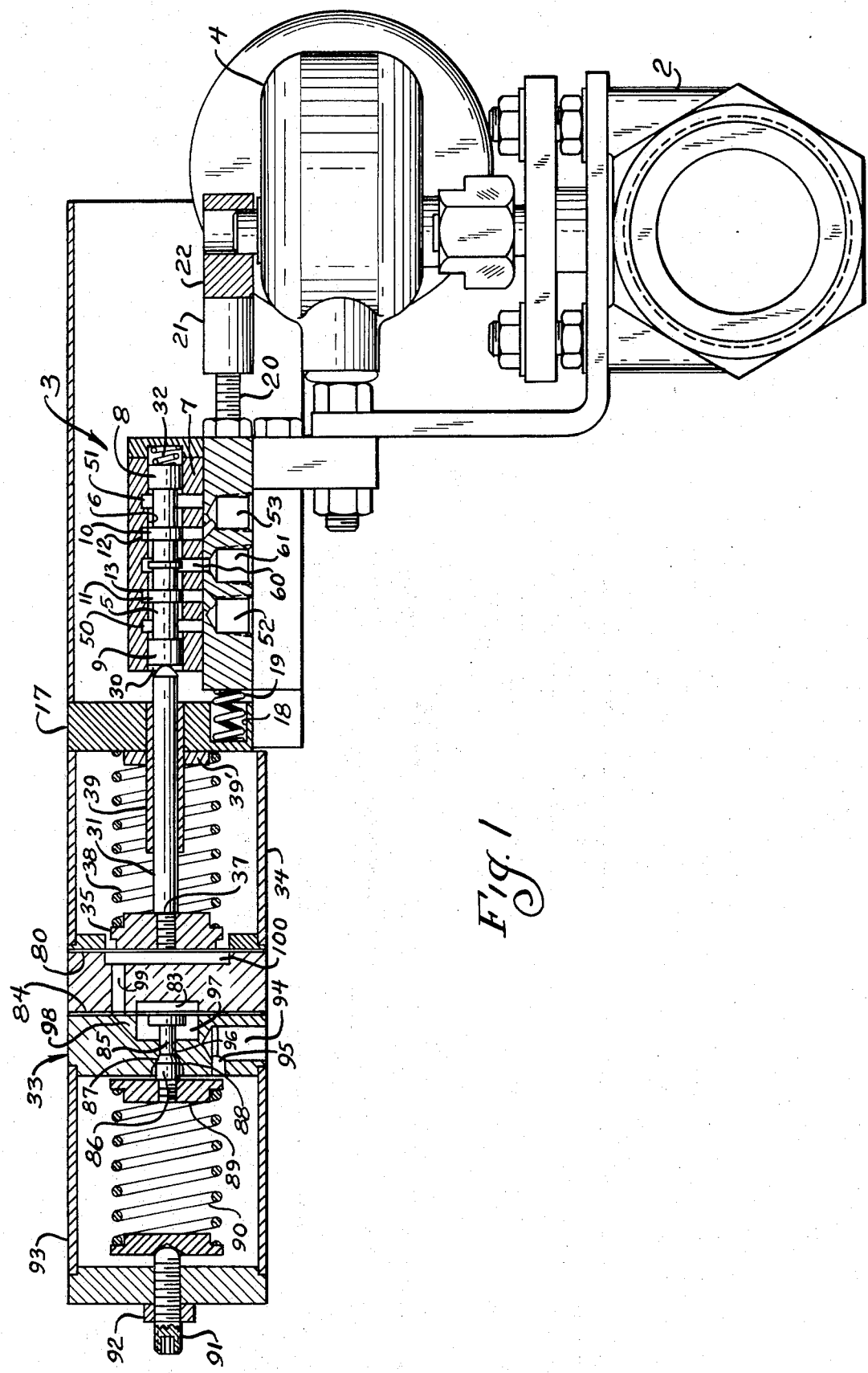
FIG. 1 is a schematic side illustration of the analog position controller of the invention with parts broken away.
Figure 2:
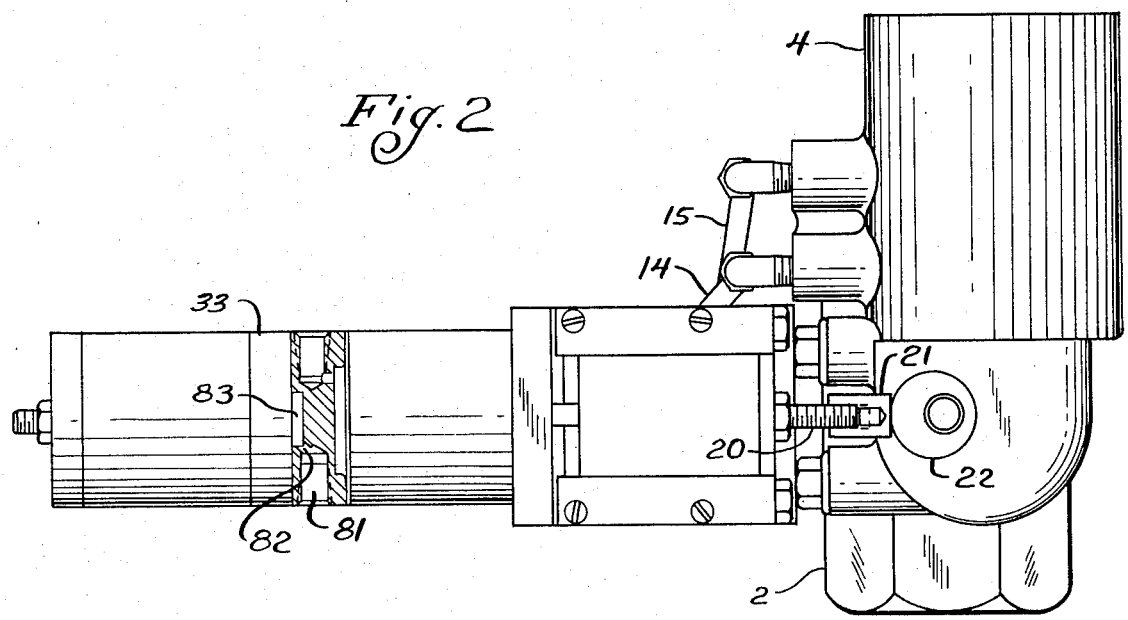
FIG. 2 is a top schematic illustration of the analog position controller of FIG. 1.
Figure 3:
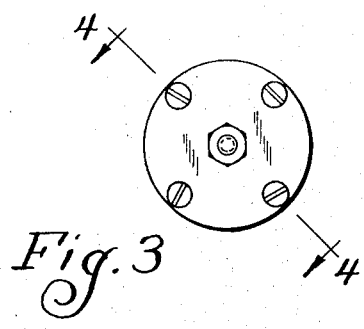
FIG. 3 is an end schematic illustration of the position controller of FIG. 1.
Figure 4:
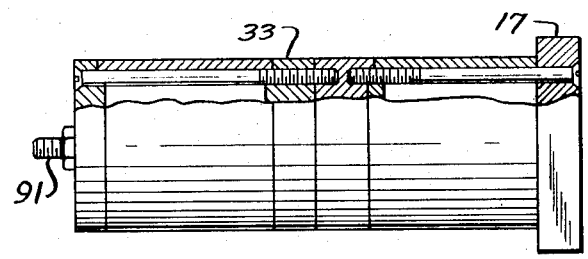
FIG. 4 is a side schematic illustration of the controller taken along line 4—4 of FIG. 3.

Referring now to FIGS. 1 to 4, there is illustrated the improved analog position controller having two stage valve control of the invention. The operation and elements of the controller herein disclosed are similar to the function and structure described in my U.S. Pat. No. 3,636,973 and specific reference is made thereto. For convenience of description corresponding elements of the apparatus of the application also present in the patent will be described herein but more specific details with respect to the operation and function of the elements are described in U.S. Pat. No. 3,636,973. Although not intended to be so limited, for convenience of illustration the analog position controller 1 is described with reference to the control of the operative position of a valve for regulating the flow of a fluid such as gas through a pipeline or conduit. In FIGS. 1 and 3 the housing 2 of a conventional valve (not shown) of any suitable type is adapted to be connected in a known manner in a pipeline or conduit (not shown) and the novel analog position controller 1 of the invention operatively cooperates with the valve to regulate the flow position of the valve. A valving assembly 3 of the analog position controller is suitably mounted on the top of the valve to transmit a pressure signal to a power device 4 which in turn controls the operative position of the valve.

Valve 2 operatively regulates the flow of fluid therethrough wherein the upstream pressure being connected to the supply of the fluid is higher than the downstream pressure, as is well-known in commercial gaslines. Therefore, the invention may be utilized in conjunction with two sensors (not shown) mounted upstream and downstream of the control valve respectively. Although pressure is the parameter being sensed and described with reference to the embodiment illustrated in FIGS. 1 and 3, it should be apparent that the parameters may be other variables in a gasline or other pipeline such as specific gravity, density, temperature, flow rate, and the like. As the use of gas in the pipeline or conduit at the utilization or supply station varies, the pressure sensed downstream may be reduced or increased according to the particular condition, and a change in operative position of the valve is necessary to vary the pressure ratio in order to maintain a constant pressure downstream in the embodiment shown.

Figure 5:
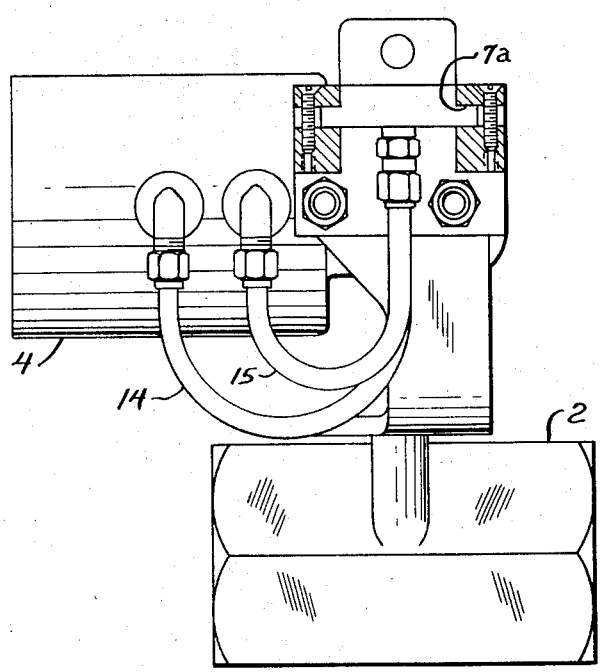
FIG. 5 is a schematic illustration of the opposite end of the position controller of FIG. 1.

The analog position controller 1 includes a valve spool 5 mounted in a central passage 6 of a valve housing 7 to allow the valve spool to slidably move therein as best shown in FIG. 1. The valve spool 5 includes two flanges 8 and 9 on each end thereof having a diameter approximate the same as the passage to be in sealing contact with the passage of the valve housing 7. Further, two inner flange members 10 and 11 also of the approximate diameter of the passage through the valve housing are mounted on the central portion of the valve spool and extend a width sufficient to cover two fluid openings 12 and 13 formed in the valve housing when the valve is in the position shown in FIG. 1. The openings 12 and 13 extend through the housing to one side thereof to communicate with power device 4 through fluid pressure lines 14 and 15 as best shown in FIGS. 2 and 5. Lines 14 and 15 are coupled to the respective openings 12 and 13 in the valve housing and to the power device 4 in a conventional sealed manner.

The valve housing 7 includes a bottom portion which is slidably mounted in ways 7a to move in a direction left to right, or vice versa as viewing FIG. 1. The valve housing 7 and the ways may be shaped or formed in any suitable manner to allow the valve housing to move longitudinally in the ways. The slidably mounted valve housing 7 is mounted adjacent a vertical plate member 17 supported on the valve housing 2 by any conventional technique. Plate 17 includes a recess 18 for receiving a spring 19 which biases the valve housing to the right as viewing FIGS. 1 and 2.

A threaded projection 20 is attached in a threaded hole on a side of the valve housing opposite to the plate 17 and a cam follower 21 is secured on the end of the projection. The cam follower 21 is adapted to be urged against a cam 22 which is operatively connected to the housing 2 in such a manner that movement of the valve element (not shown) in the control valve 2 for control of fluid therethrough proportionally rotates the cam which has a desired configuration.

The valve housing 7 further includes an opening 30 at the end thereof adjacent the vertical plate 17 to receive an actuator stem 31 wherein the end thereof contacts the valve spool 5 within the passage. The other end of the valve spool 5 is biased by a suitable spring 32 located within the central passage in the valve housing to bear against the actuator stem. The actuator stem 31 extends through the vertical housing to a diaphragm actuator assembly 33 which effects movement of the valve spool within the valve housing. The diaphragm actuator assembly 33 includes a housing 34 which surrounds the actuator stem 31 and allows movement of the stem longitudinally within the housing. A disc member 35 is attached adjacent end 37 of the actuator stem to contact a suitable compression spring 38 also in contact with the vertical plate 17 wherein the spring biases the stem actuator in leftward direction as viewing FIGS. 1 and 2. The actuator stem passes through a bearing 39 supported by a guide means 39' which also centrally locates spring 38 to allow movement of the actuator stem and control the position of the valve spool.

The valve housing further include two exhaust ports 50 and 51 which are respectively situated between the end flanges and inner flanges of the valve spool in the position illustrated for the spool in FIG. 2. The exhaust ports 50 and 51 communicate with lines 14 and 15 to either side of the actuator.

In valve housing 7 a supply port 60 is also provided having a port which is in communication with a supply passage 61 extending to one side of the valve housing. The supply passage 61 is attached to a conduit (not shown) which directs a pressure signal thereto in response to a detected parameter or from a constant supply pressure source. In the embodiment herein illustrated, the supply pressure is connected to the upstream or high-pressure side of the control valve in a conventional manner through the use of a fluid medium in the conduit which may be either gas or liquid.

The power device 4 which operates the control valve according to the parameters sensed by the position controller communicates with the valve assembly by means of the two pressure lines 14 and 15. The power device 4 may be any suitable pneumatic or hydraulic power device such as a cylinder and piston whereby the pressure signal from lines 14 and 15 is directed to opposite sides of the piston. For more detailed description of power device 4, reference is made to my U.S. Pat. No. 3,636,973.

The description of the analog controller of the invention thus far described is similar to the description found in my U.S. Pat. No. 3,636,973. For greater detail of the operation and function of the elements reference is made to the patent. Referring now to FIGS. 1 and 2 there is illustrated the improved actuator means of the invention for causing movement of stem 31 and valve spool 5 within the valve assembly. The actuator assembly includes a first diaphragm 80 attached to end 37 of the actuator stem whereby the diaphragm has the desired response characteristic. Actuator assembly includes a control port 81 which receives and is connected by suitable means (not shown) to a signal pressure. The signal pressure is representative of the parameter of the media being controlled by the control device. The parameter is sensed by a conventional transducer (not shown) to convert the parameter into a signal pressure which is transmitted to the input port of the pressure chamber as a liquid or gas pressure. The conventional sensor is, for example, disclosed as a pressure sensitive device but it should be apparent that the sensor can be sensitive to other parameters of the media being controlled such as temperature, specific gravity and the like.

The pressure introduced into control port 81 is directed through conduit 82 (shown in FIG. 2) to a chamber 83 causing this pressure to act on one side of a second diaphragm 84 mounted on the opposite side of diaphragm 80 than is the actuator stem. The force of the pressure in chamber 83 multiplied by the effective area of a diaphragm 84 is asserted against a piston 85 connected to stem 86 of an elastomeric grommet 87 seated in a conjugate seat 88. Stem 86 is also connected to a spring seat 89. The force of the pressure in chamber 83 against diaphragm 84 is thus opposed by spring 90 acting against the spring seat 89. The force of the spring 90 is readily adjusted by screw 91 which rotation is then locked by locking nut 92. Spring 90 is enclosed by a housing 93 whereby supply pressure is connected and directed to the interior of housing 93 by supply port 94 and conduit 95. Conjugate seat 88 is connected through a clearance passage 96 to a chamber 97 and thereby through conduit 98 and 99 to a chamber 100 which is the diaphragm chamber effecting movement of actuator diaphragm 80. It should be apparent that the pressure within housing 93 and within chamber 100 are separated by the elastomeric grommet 87 and conjugate seat 88.

In operation, the pressure of the sensed or controlled fluid introduced into port 81 has no effect on the controller until it reaches the value such that the pressure in chamber 83 multiplied by the effective area of diaphragm 84 is equivalent to the opposing force of spring 90. When the fluid pressure and chamber 83 multiplied by the effective area of diaphragm 84 reaches the preset force of spring 90 or slightly above, the elastomeric grommet 87 will begin to leave its conjugate seat 88 and permit fluid to pass. The fluid flow past grommet 87, clearance passage 96, chamber 97, conduits 98 and 99 and chamber 100 will cause a pressure in chamber 100 to be exerted upon the controller diaphragm 80. When the pressure upon the controller diaphragm reaches the preset pressure of the controller, the control will act to control the position of the controlled device in this case valve 4. The operation of the controller upon actuation of housing 31 and valve spool 5 is identical as described in U.S. Pat. No. 3,636,973.

While the invention has been described with reference to a preferred embodiment, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

What is claimed is:

1. An apparatus for controlling the operative position of a control means according to a sensed parameter comprising,
   controller means for transmitting a control pressure signal in response to a change from a predetermined level of an input pressure signal representative of a parameter,
   said controller means being operatively coupled to a control means regulating the parameter to vary the operative position thereof proportional to the control pressure,
   said controller means including a first pressure responsive element adapted to sense the input pressure signal and a second pressure responsive element adapted to effect transmission of a pressure signal by the control means
   valve means positioned between a source of pressure and the second element and operable to direct pressure to the second element,
   said valve means directing a pressure signal to the second element at a reduced pressure directly proportional to the level of the input signal upon the input signal reaching a predetermined level.

2. The apparatus of claim 1 wherein the first and the second element are diaphragms.

3. The apparatus of claim 2 wherein the first element possesses a less range of movement than said second element.

4. The apparatus of claim 1 wherein said valve means includes a resiliently biased mounted valve element for seating relationship on a valve seat at a level of pressure of said input signal less than a predetermined level and movable away from the seat at a valve above the predetermined level.

5. The apparatus of claim 4 wherein the valve element is a elastomeric grommet.

6. The apparatus of claim 1 wherein the input pressure is isolated from contact with the first element.

* * * * *